United States Patent [19]
Peifer et al.

[11] Patent Number: 5,492,975
[45] Date of Patent: Feb. 20, 1996

[54] POLYMER BOUND METALLOCENES

[75] Inventors: Bernd Peifer; Helmut G. Alt, both of Bayreuth, Germany; M. Bruce Welch; Syriac J. Palackal, both of Bartlesville, Okla.

[73] Assignee: Phillips Petroleum Company, Bartlesville, Okla.

[21] Appl. No.: 455,382

[22] Filed: May 31, 1995

Related U.S. Application Data

[62] Division of Ser. No. 268,425, Jun. 30, 1994.

[51] Int. Cl.$^6$ .................................................... C08F 8/42
[52] U.S. Cl. .................. 525/274; 525/332.1; 525/333.3; 525/370
[58] Field of Search ..................... 525/274, 332.1, 525/333.3

[56] References Cited

U.S. PATENT DOCUMENTS

| | | | |
|---|---|---|---|
| 4,882,384 | 11/1989 | Willis et al. | 525/105 |
| 4,985,576 | 1/1991 | Rohrmann et al. | 556/435 |
| 5,049,535 | 9/1991 | Resconi et al. | 502/117 |
| 5,084,534 | 1/1992 | Welborn, Jr. et al. | 526/160 |
| 5,145,819 | 9/1992 | Winter et al. | 502/117 |
| 5,153,157 | 10/1992 | Hlatky et al. | 502/117 |
| 5,362,824 | 11/1994 | Furtek et al. | 526/114 |

FOREIGN PATENT DOCUMENTS 4234405  8/1992  Japan .

OTHER PUBLICATIONS

J. Am. Chem. Soc., 95, pp. 2373–2375 (1973) "Activation of Homogenous Catalysts by Polymer Attachment", Gruggs et al.
J. Am. Chem. Soc., 73, pp. 5135–5138 (Nov. 1951), "Silyl-indenes and Silylindans", Sommer et al.
J. Am. Chem. Soc., 95:8, pp. 2128–2132 (Apr. 16, 1975), "Polystyrene Attached Titanocene Species, Preparation and Reactions", Bonds et al.
J. Org. Chem., 41, No. 24, pp. 3877–3882 (1976), Farrall et al.
Chem. Abstracts 92, (17):146837z, "Prepration and Structural Studies of Fluorenylsilane with Functional Groups at Silicon", Rengstl et al.
Inorganic Chemistry, vol. 24, pp. 2539–2546 (1985) "Synthesis, Structural Characterization, and Electrochemistry of Metallocenophane Complexes, [Si(alkyl)$_2$]MCl$_2$(C$_5$H$_4$)$_2$, M=Ti,Zr", Bajgur et al.
Organometallics, vol. 3, pp. 1470–1478 (1984) "Zirconocene–$\eta^4$–1,3–pentadiene Complex and its Higher Homologues, A new Synthetic Method Involving $\delta$–$\pi$ Rearrangement of the Hydrido–2,4–pentadienylzirconium Species", Yasuda et al.
J. of Organometallic Chemistry, vol. 369, pp. 357–379 (1989), "ansa–Metallocene Derivatives, XVII. Racemic and Meso Diasteromers of Group IV Metallocene Derivatives with Symmetrically Substituted, Dimethylsilanediylbridged Ligand Frameworks. Crystal Structure of R,S–Me$_2$Si(3–t–Bu–5–MeC$_5$H$_2$)ZrCl$_2$", Wiesenfeldt et al.

*Primary Examiner*—Bernard Lipman
*Attorney, Agent, or Firm*—Richmond, Phillips, Hitchcock & Fish

[57] ABSTRACT

A polymer bound ligand represented by the formula QM(R)$_m$ and process for preparing same are provided, wherein Q is a polystyrene, M is Si, C, Ge, Sn, P, or N, each R is a that at least one R is a cyclopentadienyl-type compound, and m is 2 or 3, said process comprising reacting a metallated polystyrene and an organohalide compound, wherein the polystyrene is metallated with an alkali metal, and wherein said organohalide compound is represented by the formula XM(R)$_m$ wherein X is a halide. Other aspects of the present invention include a polymer bound metallocene represented by the formula QM(R)$_m$ZY$_n$ and a process for preparing same, wherein Z is a transition metal, Y is a halide, methyl, hydrogen, or a cyclopentadienyl-type group, and n is 2 or 3. Other aspects of the present invention include a catalyst system comprising the polymer bound metallocene and an organoaluminoxane, a method for preparing same, and a polymerization process employing the catalyst system.

7 Claims, No Drawings

POLYMER BOUND METALLOCENES

This is a divisional of copending application Ser. No. 08/268,425, filed Jun. 30, 1994.

The present invention relates to polymer bound ligands, polymer bound metallocenes, catalyst systems, processes for preparing same, and the use of such catalyst systems in olefin polymerization.

BACKGROUND OF THE INVENTION

Metallocene catalysts have been used in homogenous solution polymerizations. Since such homogeneous catalysts are soluble in the polymerization medium it is generally observed that the resulting polymer has low bulk density.

Attempts to use soluble metallocene catalysts in a slurry or particle form type polymerization are currently not commercially feasible. It has been observed that when such particle form polymerizations are carried out in the presence of a soluble metallocene catalyst, large amounts of polymeric material are formed on the surfaces of the polymerization vessel. This fouling produces an adverse effect on the heat transfer and also results in the need for periodic, if not continuous, cleaning of the reactor.

It would therefore be desirable to produce economical solid metallocene catalysts useful in polymerization processes free of reactor fouling.

SUMMARY OF THE INVENTION

An object of the present invention is to provide a solid polymer bound ligand useful in preparing heterogeneous metallocene catalysts.

Another object of the present invention is to provide an economical process for preparing a solid polymer bound ligand useful in preparing metallocene catalysts.

Another object of the present invention is to provide a solid polymer bound metallocene useful in olefin polymerization which does not produce significant reactor fouling in a particle form polymerization process.

Another object of the present invention is to provide an efficient and economical process for preparing a polymer bound metallocene catalyst.

Still another object of the present invention is to provide a polymerization process free of significant reactor fouling, especially in a particle form process.

In accordance with the present invention, a polymer bound ligand represented by the formula $QM(R)_m$ and a process for preparing same are provided, wherein Q is a polystyrene, M is Si, C, Ge, Sn, P, or N, each R is a hydrocarbyl group individually selected, with the proviso that at least one R is a cyclopentadienyl-type group and when M is C at least two R groups are cyclopentadienyl-type groups, as hereinafter defined, and m is 2 or 3, said process comprising reacting a metallated polystyrene and an organohalide compound, wherein the polystyrene is metallated with an alkali metal, and wherein said organohalide compound is represented by the formula $XM(R)_m$ wherein X is a halide. Other aspects of the present invention include a polymer bound metallocene represented by the formula $QM(R)_m ZY_n$, wherein Z is a transition metal, Y is a halide, methyl, hydrogen, or a cyclopentadienyl-type group, and n is 2 or 3, and a process for preparing same comprising reacting the polymer bound ligand and an alkali metal compound to produce a metallated polymer bound ligand and then reacting the metallated polymer bound ligand and a transition metal halide, $ZY_4$. Other aspects of the present invention include a catalyst system comprising the polymer bound metallocene and an organoaluminoxane, a method for preparing same, and a polymerization process employing the catalyst system.

DETAILED DESCRIPTION OF THE INVENTION

A polymer bound ligand represented by the formula $QM(R)_m$, wherein Q is a polystyrene, M is Si, C, Ge, Sn, P, or N, each R is a hydrocarbyl group individually selected, with the proviso that at least one R is a cyclopentadienyl-type group and when M is C at least two R groups are cyclopentadienyl-type groups, and m is 2 or 3, is prepared by reacting a metallated polystyrene and an organohalide compound, wherein said organohalide compound is represented by the formula $XM(R)_m$ wherein X is a halide and M, R and m are as described above.

Cyclopentadienyl-type groups, as defined herein, are groups containing a cyclopentadienyl type group and include cyclopentadienyl, substituted cyclopentadienyl, indenyl, substituted indenyl, fluorenyl, and substituted fluorenyl. The substituents include hydrocarbyl groups containing 1 to 12 carbon atoms, alkoxy groups containing 1 to 12 carbon atoms, or halide. Preferably the substituents are alkyl groups containing 1 to 10 carbon atoms, more preferably 1 to 6 carbon atoms. Some examples of substituents include methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloride, bromide, and iodide.

The term polystyrene, as used herein, includes polystyrene, crosslinked polystyrene, polystyrene derivatives, such as methylated polystyrene, polystyrylcyclopentadiene, and (methylated polystyryl)cyclopentadiene, and functionalized polystyrene, such as halogenated polystyrene, which are capable of being metallated with an alkali metal. Polystyrene is commercially available and can be prepared by any method known in the art. A typical example for preparing polystyrene comprises reacting styrene and divinylbenzene at polymerization conditions. The polymerization conditions can vary broadly. Generally the polymerization temperature is in the range of from about 20° C. to about 150° C.

Metallated polystyrene can be prepared by any method known in the art. One such method involves reacting polystyrene with an alkali metal compound. Alkali metal compounds suitable for preparing metallated polystyrene are represented by the formula AR', wherein A is an alkali metal selected from the group consisting of lithium, sodium, and potassium and wherein R' is a hydrocarbyl group selected from the group consisting of alkyl, cycloalkyl, and aryl groups containing 1 to 12 carbon atoms. Preferably R is an alkyl group containing 1 to 10 carbon atoms. Lithium alkyls containing 1 to 8 carbon atoms are especially preferred. Examples of preferred lithium alkyls include methyllithium, ethyllithium, propyllithium, butyllithium, pentyllithium and hexyllithium. Excellent results have been obtained with n-butyllithium and it is especially preferred. The conditions for metallating polystyrene can vary broadly. Generally the temperature is in the range of from about 0° C. to about 100° C. When preparing the metallated polystyrene, the alkali metal compound is generally present in an amount in the range of from about 0.1 mole to about 50 moles alkali metal compound per kilogram of polystyrene, preferably about 0.2 mole to about 25 moles, and more preferably about 0.5 moles to about 20 moles.

Another effective method for preparing metallated polystyrene involves reacting the alkali metal compound described above with halogenated polystyrene. A typical method of preparing halogenated polystyrene involves reacting polystyrene, $Br_2$, and $FeCl_3$ in chloroform, as disclosed in J. Org. Chem. Vol. 41, No. 24, pages 3877–82 (1976), the disclosure of which is incorporated herein by reference. The conditions for halogenating polystyrene by this method can vary broadly. Generally the reaction temperature is in the range of from about 0° C. to about 100° C. Generally the $Br_2$ is present in an amount in the range of from about 0.1 mole to about 50 moles $Br_2$ per kilogram polystyrene, preferably about 0.2 mole to about 25 moles, and more preferably about 0.5 moles to about 20 moles. The halogenated polystyrene is then reacted with the alkali metal compound. The alkali metal compound is generally present in an amount in the range of from about 0.1 mole to about 50 moles alkali metal compound per kilogram of halogenated polystyrene, preferably about 0.2 mole to about 25 moles, and more preferably about 0.5 moles to about 20 moles.

Another method for preparing metallated polystyrene involves reacting chloromethylated polystyrene, with a metallated cyclopentadienyl-type compound. The chloromethylated polystyrene is prepared by reacting polystyrene with chloromethyl alkyl ether to produce chloromethylated polystyrene, wherein the alkyl contains 1 to 6 carbon atoms, preferably 1 to 3. The metallated cyclopentadienyl-type compound is an alkali metal salt. The metallated cyclopentadienyl-type compound contains a cyclopentadienyl-type group, and includes the groups cyclopentadienyl, substituted cyclopentadienyl, indenyl, and substituted indenyl, as described above. Suitable metallated cyclopentadienyl-type compounds are commercially available, examples include sodium cyclopentadiene or sodium indene. Metallated cyclopentadienyl-type compounds can be prepared by any method known in the art. Generally a cyclopentadienyl-type compound is reacted with an alkali metal, such as sodium, or an alkali metal compound, such as those described above for metallating polystyrene and disclosed in J. Am. Chem. Soc. 73, pages 5135–5138. For example, alkyllithium and alkylsodium compounds containing 1 to 8 carbon atoms are especially effective. The reaction conditions for preparing the metallated cyclopentadienyl-type compound can vary broadly depending on the reactants employed. Generally the reaction temperatures for preparing the metallated cyclopentadienyl-type compound are in the range of from about 0° C. to about 200° C. The metallated cyclopentadienyl-type compound is then reacted with the chloromethylated polystyrene to produce a cyclopentadienyl-type polystyrene, such as (methylated polystyryl)cyclpentadiene or (methylated polystyryl)indene. An alkali metal compound of the type described above is then reacted with the cyclopentadienyl-type polystyrene to produce a metallated polystyrene. A typical method is disclosed in J. Am. Chem. Soc., 95, pages 2373–75 (1973) and J. Am. Chem. Soc., 97:8, pages 2128–32 (Apr. 16, 1975), the disclosures of which are incorporated herein by reference. The amount of chloromethyl alkyl ether relative to the amount of polystyrene is in the range of from about 0.1 mole to about 50 moles per kilogram polystyrene, preferably about 0.2 mole to about 25 moles, and more preferably about 0.5 moles to about 20 moles. The amount of metallated cyclopentadienyl-type compound relative to the amount of chloromethylated polystyrene is in the range of from about 0.1 mole to about 50 moles per kilogram chloromethylated polystyrene, preferably about 0.2 mole to about 25 moles, and more preferably about 0.5 moles to about 20 moles. The amount of alkali metal compound employed relative to the polystyrene is in the range of from about 0.1 mole to about 50 moles per kilogram polystyrene, preferably about 0.2 mole to about 25 moles, and more preferably about 0.5 moles to about 20 moles. The reaction conditions of the various steps in preparing the metallated polystyrene will generally include a temperature within the range of from about 0° C. to about 100° C.

The metallated polystyrene is then reacted with an organohalide compound. The organohalide compound is represented by the formula $XM(R)_m$ wherein X is a halide, M is Si, C, Ge, Sn, P, or N, each R is a hydrocarbyl group independently selected from the group consisting of alkyl, cycloalkyl, aryl, and cyclopentadienyl-type groups containing 1 to 36 carbon atoms, preferably 1 to 24 atoms, with the proviso that at least one R is a cyclopentadienyl-type group and when M is C at least two R groups are cyclopentadienyl-type groups, and m is 2 or 3. Of the organohalide compounds, chlorosilanes are preferred. Examples of suitable organohalide compounds include (chloro)(cyclopentadienyl)(diphenyl)silane, (chloro)(dicyclopentadienyl)(methyl)silane, (chloro)(cyclopentadienyl)(9-fluorenyl)(methyl)silane, (chloro)(difluorenyl)(methyl)silane, (chloro)(cyclopentadienyl)(methyl)(phenyl)silane, (chloro)(1-indenyl)(9-fluorenyl)(phenyl)silane, (chloro)(diphenyl)(9-fluorenyl)silane, (chloro)(9-fluorenyl)(methyl)(phenyl)silane, (chloro)(dimethyl)(1-indenyl)silane, (chloro)(diindenyl)(methyl)silane, (chloro)(cyclopentadienyl)(diphenyl)methane, (chloro)(dicyclpentadienyl)(methyl)methane, (chloro)(cyclopentadienyl)(9-fluorenyl)(methyl)methane, (chloro)(difluorenyl)(methyl)methane, (chloro)(cyclopentadienyl)(methyl)(phenyl)methane, (chloro)(1-indenyl)(9-fluorenyl)(phenyl)methane, (chloro)(diphenyl)(9-fluorenyl)methane, (chloro)(9-fluorenyl)(methyl)(phenyl)methane, (chloro)(dimethyl)(1-indenyl)methane, and (chloro)(diindenyl)(methyl)methane. Of the organohalide compounds, (chloro)(diphenyl)(9-fluorenyl)silane and (chloro)(cyclopentadienyl)(9-fluorenyl)(methyl)silane are preferred.

The organohalide compounds can be prepared by any method known in the art. One such method is disclosed in J. Am. Chem. Soc., 73, pages 5135–5138, "Silylindenes and Silylindans", Sommer et al. the disclosure of which is incorporated herein by reference. The method involves reacting organohalosilanes, such as dimethyldichlorosilane, with metallated cydopentadienyl-type compounds, such as 1-indenylsodium or 1-indenyllithium. Typical examples of other suitable combinations include reacting dichlorodiphenylsilane with fluorenyllithium, or (9-fluorenyl)(methyl)(dichloro)silane with cyclopentadienylsodium, or methyltrichlorosilane with two equivalents fluorenyllithium. Metallated cydopentadienyl-type compounds can be prepared as described above. The reaction conditions for preparing the organohalide compound can vary broadly depending on the reactants employed.

When reacting the organohalide compound and the metallated polystyrene, the organohalide compound is generally present in an amount in the range of from about 0.1 mole to about 50 moles organohalide compound per kilogram metallated polystyrene, preferably about 0.2 mole to about 25 moles, and more preferably about 0.5 moles to about 20 moles. The metallated polystyrene and the organohalide compound are reacted at a temperature in the range of from about 0° C. to about 100° C.

Examples of typical polymer bound ligands include (cyclopentadienyl)(diphenyl)(polystyryl)silane, (dicyclpentadienyl)(methyl)(polystyryl)silane, (cyclopentadienyl)(9-fluorenyl)(methyl)(polystyryl)silane, (cyclopentadienyl)(9-fluorenyl)(methyl)((polystyryl)methyl)silane, (difluorenyl)(methyl)(polystyryl)silane, (cyclopentadienyl)(methyl)(phenyl)(polystyryl)silane, (1-indenyl)(9-fluorenyl)(phenyl)(polystyryl)silane, (diphenyl)(9-fluorenyl)(polystyryl)silane, (diphenyl)(9-fluorenyl)((polystyryl)methyl)silane, (diphenyl)(9-fluorenyl)((polystyryl)cyclopentadienyl)silane, (9-fluorenyl)(methyl)(phenyl)(polystyryl)silane, (dimethyl)(1-indenyl)(polystyryl)silane, (1-indenyl)(methyl)(phenyl)(polystyryl)silane, (methyl)(diindenyl)(polystyryl)silane, (cyclopentadienyl)(diphenyl)(polystyryl)methane, (dicyclpentadienyl)(methyl)(polystyryl)methane, (cyclopentadienyl)(9-fluorenyl)(methyl)(polystyryl)methane, (cyclopentadienyl)(9-fluorenyl)(methyl)((polystyryl)methyl)methane, (difluorenyl)(methyl)(polystyryl)methane, (cyclopentadienyl)(methyl)(phenyl)(polystyryl)methane, (1-indenyl)(9-fluorenyl)(phenyl)(polystyryl)methane, (diphenyl)(9-fluorenyl)(polystyryl)methane, (diphenyl)(9-fluorenyl)((polystyryl)cyclopentadienyl)methane, (9-fluorenyl)(methyl)(phenyl)(polystyryl)methane, (dimethyl)(1-indenyl)(polystyryl)methane, (methyl)(1-indenyl)(polystyryl)methane, and (diindenyl)(methyl)(phenyl)(polystyryl)methane. Of the polymer bound ligands, (diphenyl)(9-fluorenyl)((polystyryl)cyclopentadienyl)silane, (cyclopentadienyl)(9-fluorenyl)(methyl)(polystyryl)silane, and (diphenyl)(9-fluorenyl)(polystyryl)silane are preferred.

A polymer bound metallocene represented by the formula $QM(R)_mZY_n$ can be prepared by reacting a metallated polymer bound ligand with a metal halide, wherein Z is a transition metal and is Zr, Hf, Ti, or V, and wherein each Y is individually selected from the group consisting of halides, methyl, hydrogen, and cyclopentadienyl-type groups containing 5 to 36 carbon atoms, with the proviso that at least three Y groups are selected from halides. Cyclopentadienyl-type groups include those described above for the organohalide compound. The metallated polymer bound ligand can be prepared by reacting the polymer bound ligand and an alkali metal compound. Suitable conditions and alkali metal compounds for preparing the metallated polymer bound ligand are those described above for preparing the metallated polystyrene and include a temperature in the range of from about 0° C. to about 100° C.

The metal halide is represented by the formula $ZY_4$, wherein Z and Y are as described above. Suitable metal halides include $TiCl_4$, $ZrCl_4$, $HfCl_4$, $VCl_4$, $TiBr_4$, $ZrBr_4$, $HfBr_4$, $VBr_4$, $TiI_4$, $ZrI_4$, $HfI_4$, $VI_4$, cyclopentadienylzirconium trichloride, cyclopentadienyltitanium trichloride, cyclopentadienylhafnium trichloride, cyclopentadienylvanadium trichloride, pentamethylcyclopentadienylzirconium trichloride, pentaamethylcyclopentadienyltitanium trichloride, pentamethylcyclopentadienylhafnium trichloride, pentamethylcyclopentadienylvanadium trichloride, indenylzirconium trichloride, and indenyltitanium trichloride. Zirconium-containing and titanium-containing metal halides are preferred. Zirconium-containing metal halides are more preferred and zirconium tetrachloride and cyclopentadienylzirconium trichloride are especially preferred.

The metal halide is generally present in an amount in the range of from about 0.1 mole to about 50 moles metal halide per kilogram polymer bound ligand, preferably about 0.2 mole to about 25 moles, and more preferably about 0.5 moles to about 20 moles. The metallated polymer bound ligand and the metal halide are generally reacted at a temperature in the range of from about 0° C. to about 100° C.

Examples of typical polymer bound metallocenes include (diphenyl)(9-fluorenyl)((polystyryl)cyclopentadienyl)silane zirconium dichloride, (diphenyl)(9-fluorenyl)((polystyryl)methyl)silane cyclopentadienylzirconium dichloride, (diphenyl)(9-fluorenyl)(polystyryl)silane cyclopentadienylzirconium dichloride, (cyclopentadienyl)(diphenyl)(polystyryl)silane cyclopentadienylzirconium dichloride, (dicyclpentadienyl)(methyl)(polystyryl)silane zirconium dichloride, (cyclopentadienyl)(9-fluorenyl)(methyl)(polystyryl)silane zirconium dichloride, (cyclopentadienyl)(9-fluorenyl)(methyl)((polystyryl)methyl)silane zirconium dichloride, (difluorenyl)(methyl)(polystyryl)silane zirconium dichloride, (cyclopentadienyl)(methyl)(phenyl)(polystyryl)silane indenylzirconium dichloride, (1-indenyl)(9-fluorenyl)(phenyl)(polystyryl)silane zirconium dichloride, (9-fluorenyl)(methyl)(phenyl)(polystyryl)silane cyclopentadienylzirconium dichloride, (dimethyl)(1-indenyl)(polystyryl)silane indenylzirconium dichloride, (1-indenyl)(methyl)(polystyryl)silane cyclopentadienylzirconium dichloride, (diindenyl)(methyl)(polystyryl)silane zirconium dichloride, (diphenyl)(9-fluorenyl)(polystyrylcyclopentadienyl)methane zirconium dichloride, (cyclopentadienyl)(diphenyl)(polystyryl)methane cyclopentadienylzirconium dichloride, (dicyclpentadienyl)(methyl)(polystyryl)methane zirconium dichloride, (cyclopentadienyl)(9-fluorenyl)(methyl)(polystyryl)methane zirconium dichloride, (difluorenyl)(methyl)(polystyryl)methane zirconium dichloride, (cyclopentadienyl)(methyl)(phenyl)(polystyryl)methane cyclopentadienylzirconium dichloride, (1-indenyl)(9-fluorenyl)(phenyl)(polystyryl)methane zirconium dichloride, dichloride, (9-fluorenyl)(methyl)(phenyl)(polystyryl)methane cyclopentadienylzirconium dichloride, (dimethyl)(1-indenyl)(polystyryl)methane cyclopentadienylzirconium dichloride, (1-indenyl)(methyl)(polystyryl)methane cyclopentadienylzirconium dichloride, and (diindenyl)(methyl)(polystyryl)methane zirconium dichloride. Of these, (diphenyl)(9-fluorenyl)((polystyryl)cyclopentadienyl)silane zirconium dichloride, (cyclopentadienyl)(9-fluorenyl)(methyl)(polystyryl)silane zirconium dichloride, and (diphenyl)(9-fluorenyl)(polystyryl)silane cyclopentadienylzirconium dichloride are preferred.

The polymer bound metallocenes can be used in combination with a suitable cocatalyst to produce catalyst systems for the polymerization of olefins. Examples of suitable cocatalysts include any of those organometallic cocatalysts which have in the past been employed in conjunction with transition metal-containing olefin polymerization catalysts. Some typical examples include organometallic compounds of metals of Groups IA, IIA, and IIIB of the Periodic Table. Examples of such compounds include organometallic halide compounds, organometallic hydrides, and metal hydrides. Some specific examples include triethylaluminum, tri-isobutylaluminum, diethylaluminum chloride, diethylaluminum hydride, and the like. Other examples of known cocatalysts include the use of a stable non-coordinating counter anion such as disclosed in U.S. Pat. No. 5,155,080, e.g. using triphenyl carbenium tetrakis(petafluorophenyl)boronate. Another example would be the use of a mixture of trimethylaluminum and dimethylfluoroaluminum such as disclosed by Zambelli et, Macromolecules, 22, 2186 (1989).

Currently, organoaluminoxane cocatalysts are the preferred cocatalysts. Various techniques are known for making organoaluminoxanes. One technique involves the controlled addition of water to a trialkylaluminum. Another technique involves combining a trialkylaluminum and a hydrocarbon with a compound containing water of adsorption or a salt containing water of crystallization. Many suitable organoaluminoxanes are commercially available.

Typically the organoaluminoxanes comprise oligomeric, linear and/or cyclic hydrocarbyl aluminoxanes having repeating units of the formula

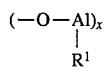

wherein each $R^1$ is a hydrocarbyl group, preferably an alkyl group containing 1–8 carbon atoms, x is 2 to 50, preferably 4 to 40, and more preferably 10 to 40. Typically $R^1$ is predominantly methyl or ethyl. Preferably at least about 30 mole percent of the repeating groups have an $R^1$ which is methyl, more preferably at least 50 mole percent, and still more preferably at least 70 mole percent. Generally in the preparation of an organoaluminoxane, a mixture of linear and cyclic compounds is obtained. Organoaluminoxanes are commercially available in the form of hydrocarbon solutions, generally aromatic hydrocarbon solutions.

A solid organoaluminoxy product can be prepared by reacting an organoaluminoxane and an oxygen-containing compound selected from the group consisting of organo boroxines, organic boranes, organic peroxides, alkylene oxides, and organic carbonates. Organo boroxines are preferred.

The amount of organoaluminoxane relative to the polymer bound metallocene can vary broadly depending upon the particular catalyst selected and the results desired. Typically, the organoaluminoxane is present in the amount of about 0.5 moles to about 10,000 moles aluminum per mole of metal in the polymer bound metallocene, preferably about 10 moles to about 5,000 moles, and more preferably 50 moles to 5,000 moles.

The above described steps for preparing the polymer bound ligand, the polymer bound metallocene, and the catalyst system are generally conducted in the presence of a solvent or a diluent. Typical solvents or diluents include for example tetrahydrofuran, dichloromethane, toluene, heptane, hexane, cyclohexane, toluene, benzene, and diethylether. Preferably the polymer bound ligand and the polymer bound metallocene are prepared employing a noncoordinating solvent such as a noncyclic ether.

A variety of olefin compounds are suitable for use as monomers in the polymerization process of the present invention. Olefins which can be employed include linear, branched, and cyclic aliphatic olefins. While the invention would appear to be suitable for use with any aliphatic olefin known to be employed with metallocenes, those olefins having 2 to 18 carbon atoms are most often used. Ethylene and propylene are especially preferred. Often a second olefin (comonomer) having from 2 to 12 carbon atoms, preferably from 4 to 10 carbon atoms can be employed. Typical monomers include propylene, 1-butene, 1-pentene, 4-methyl-1-pentene, 2-pentene, 1-hexene, 2-hexene, cyclohexene, 1-heptene, and dienes such as butadiene.

The polymerization processes according to the present invention can be performed either batchwise or continuously. The olefin, polymer bound metallocene, and organoaluminoxane cocatalyst can be contacted in any order. It is preferred that the polymer bound metallocene and the organoaluminoxane are contacted prior to contacting with the olefin. Generally a diluent such as isobutane is added to the reactor. The reactor is heated to the desired reaction temperature and olefin, such as ethylene, is then admitted and maintained at a partial pressure within a range of from about 0.5 MPa to about 5.0 MPa (70–725 psi) for best results. At the end of the designated reaction period, the polymerization reaction is terminated and the unreacted olefin and diluent vented. The reactor can be opened and the polymer can be collected as a free-flowing white solid and dried to obtain the product.

The reaction conditions for contacting the olefin and the catalyst system can vary broadly depending on the olefin employed, and are those sufficient to polymerize the olefins. Generally the temperature is in the range of about 20° C. to about 300° C., preferably in the range of 50° C. to 110° C. The pressure is generally in the range of from about 0.5 MPa to about 5.0 MPa (70–725 psi).

The present invention is particularly useful in a gas phase particle form or slurry type polymerization. A particularly preferred type particle form polymerization involves a continuous loop reactor which is continuously charged with suitable quantities of diluent, catalyst system, and polymerizable compounds in any desirable order. Typically the polymerization will include a higher alpha-olefin comonomer and optionally hydrogen. Generally the particle form polymerization is conducted at a temperature in the range of about 50° C. to about 110° C., although higher and lower temperatures can be used. Polyethylenes of varying molecular weight distribution can be produced by varying the amount of hydrogen. The reaction product can be continuously withdrawn and the polymer recovered as appropriate, generally by flashing the diluent and unreacted monomers and drying the resulting polymer.

The following examples serve to show the present invention in detail by way of illustration and not by way of limitation.

EXAMPLES

Example 1

Polystyrene was prepared in the following manner. A 2-L 3-neck round-bottom flask equipped with stirrer, gas inlet, and thermometer was charged with a solution of 5.00 g poly(vinyl alcohol) in 1 L water and then 200 ml (1.74 moles) styrene was added. Then 73.6 mL (0.435 mole) divinylbenzene (70% in ethylvinylbenzene) and 1.00 g (6.01 mmol) of azobisbutyronitrile were mixed and added to the flask. The stirrer speed was regulated to adjust the drop size of the monomer. The temperature was increased to 60° C. Particles were seen after about 1 hour and the stirrer speed was doubled to prevent coagulation of the particles. The temperature was increased to 90° C. over a period of 5 hours and the reaction was maintained at this temperature for 1 hour. The reaction mixture was cooled and filtered and the polymer was washed 10 times with 2 L water, 500 mL tetrahydrofuran (THF) and 500 mL acetone. The thus produced polystyrene polymer was dried overnight at 80° C. and then separated with sieves into fractions of uniform grain size.

Chloromethylated polystyrene was prepared by reacting 60.00 g polystyrene with 200 mL chloromethyl methyl ether for ½ hour at room temperature in a well ventilated fume hood. The mixture was cooled to 0° C. and 12 mL $SnCl_4$ in 50.0 mL chloromethyl methyl ether were added dropwise over a period of ½ hour. The reaction mixture was stirred for 72 hours at room temperature and then filtered. The yellow reaction product was washed with 500 mL dioxane/water (1:1), 500 mL dioxane/water/conc. HCl (2:2:1) and 500 mL dioxane. The thus produced chloromethylated polystyrene polymer was dried 48 hours at room temperature.

Methylpolystyrylcyclopentadiene was prepared by reacting 20.00 g chloromethylated polystyrene (24.0 mmol Cl) and 4.15 g (47.11 mmol) of cyclopentadienylsodium in 100 mL THF. The reaction mixture was stirred for 120 hours at room temperature. The yellow reaction product was washed 5 times with 50 mL ethanol and 5 times with 50 mL THF. The thus produced methylpolystyrylcyclopentadiene polymer was dried overnight at room temperature.

Lithiated methylpolystyrylcyclopentadiene was prepared by reacting 5.90 g methylpolystyrylcyclopentadiene with 20.0 mL (32.00 mmol) n-butyllithium in 50 mL diethyl ether. The reaction mixture was stirred for 48 hours at room temperature. The supernatant was decanted and the thus produced orange lithiated methylpolystyrylcyclopentadienyl was washed 3 times with 50 mL of diethyl ether.

The organohalide compound (chloro)(diphenyl)(9-fluorenyl)silane was prepared by reacting fluorenyllithium with (dichloro)(diphenyl)silane. The fluorenyllithium was prepared by slowly reacting over ice 25.00 g (150.40 mmol) fluorene with 94.0 mL (150.40) n-butyllithium (1.6M in hexane) in 150 mL diethyl ether. The dark red reaction solution was stirred overnight at room temperature. The solvent was evaporated in a vacuum. The thus produced yellow, solid fluorenyllithium was added to a solution of 45.0 mL (216.82 mmol) (dichloro)(diphenyl)silane in 500 mL pentane. The reaction mixture was stirred overnight at room temperature. The solvent was evaporated in a vacuum, the yellow residue was extracted with diethyl ether and filtered through sodium sulfate. The solvent was evaporated in a vacuum and the viscous residue was mixed with 100 mL pentane. The thus produced organohalide compound (chloro)(diphenyl)(9-fluorenyl)silane precipitated as a white solid with a yield of 80–90%.

The polymer bound ligand (diphenyl)(9-fluorenyl)((polystyryl)methyl)cyclopenladienyl)silane was prepared by reacting (chloro)(diphenyl)(9-fluorenyl)silane with lithiated methylpolystyrylcyclopentadiene prepared as described above. The lithiated methylpolystyrylcyclopentadienyl was reacted with 5 mL N,N,N',N'-tetramethylethylenediamine and 2.68 g (7.00 mmol) (chloro)(diphenyl)(9-fluorenyl)silane in 50 mL diethyl ether. The reaction mixture was stirred 48 hours at room temperature. The supernatant was decanted and the thus produced yellowish polymer bound ligand (diphenyl)(9-fluorenyl)((polystyryl)methyl)cyclopentadienyl)silane was washed 5 times with 50 mL diethyl ether.

The polymer bound metallocene (diphenyl)(9-fluorenyl)((polystyryl)methyl)cyclopentadienyl)silane zirconium dichloride was prepared by reacting lithiated polymer bound ligand with zirconium tetrachloride. The lithiated polymer bound ligand was prepared by reacting (diphenyl)(9-fluorenyl)((polystyryl)methyl)cyclopentadienyl)silane prepared as described above and 20.0 mL (32.00 mmol) n-butyllithium in 50 mL diethyl ether. The reaction mixture was stirred for 48 hours at room temperature. The supernatant was decanted and the orange polymer was washed 3 times with 50 mL diethyl ether. The thus lithiated polymer bound ligand was reacted with 1.65 g (7.08 mmol) zirconium tetrachloride in 50 mL diethyl ether. The reaction mixture was stirred overnight at room temperature. The supernatant was decanted and the yellow polymer was washed 3 times with 50 mL diethyl ether. The thus produced polymer bound metallocene (diphenyl)(9-fluorenyl)((polystyryl)methyl)cyclopentadienyl)silane zirconium dichloride was dried overnight at room temperature.

Example 2

Lithiated polystyrene was prepared by reacting brominated polystyrene and n-butyllithium. Brominated polystyrene was prepared by reacting 50.00 g polystyrene (0.4 mol phenyl groups) prepared as described above, 6.0 mL Br$_2$ (0.1 mol) and 1.0 g FeCl$_3$ in 500 mL chloroform. The red-brown suspension was stirred for 48 hours at room temperature. The polymer was filtered and washed 2 times with 100 mL THF, 6 times with 100 mL toluene, 2 times with 100 mL acetone, 1 time with 100 mL hexane and 1 time with 1 00 mL ether. The thus produced yellow brominated polystyrene polymer was dried overnight at 60° C. The brominated polystyrene was then lithiated by reacting 5.60 g brominated polystyrene (16.8 mmol Br) with 20.0 mL (32.0 mmol) n-butyllithium (1.6M in hexane) in 60 mL toluene. The mixture was stirred for 5 hours at 60° C. The yellow polymer turned brown during the process. The supernatant was decanted and the thus produced lithiated polystyrene was washed 5 times with 50 mL diethyl ether.

The organohalide compound (chloro)(cyclopentadienyl)(9-fluorenyl)(methyl)silane was prepared by reacting (9-fluorenyl)(methyl)(dichloro)silane and cyclopentadienyl sodium. The (9-fluorenyl)(methyl)(dichloro)silane was prepared by reacting fluorenyllithium and (methyl)(trichloro)silane. The fluorenyllithium was prepared by reacting 20 g (120 mmol) of fluorene and 76 mL butyllithium (1.6M in hexane) in 200 mL ether. The mixture was stirred for one hour at room temperature and then the solvent was removed. The thus prepared solid fluorenyllithium was added in portions to a solution of 36 g (40 mL, 241 mmol) of (methyl)(trichloro)silane in 700 mL pentane. The mixture was stirred for one hour at room temperature and the reaction mixture was then filtered over sodium sulfate. The solution was concentrated by evaporation to 30% of its volume and crystallized at −30C. The thus produced (9-fluorenyl)(methyl)(dichloro)silane was in the form of a white crystalline powder with a yield of 95%. Then 5 g (17.9 mmol) (9-fluorenyl)(methyl)(dichloro)silane was reacted with 1.6 g (18 mmol) cyclopentadienyl sodium. The mixture was stirred for 4 hours at room temperature. The mixture was filtered over sodium sulfate and the solvent removed. The thus produced (chloro)(cyclopentadienyl)(9-fluorenyl)(methyl)silane was a bright yellow solid.

The polymer bound ligand (cyclopentadienyl)(9-fluorenyl)(methyl)(polystyryl)silane was prepared by reacting (chloro)(cyclopentadienyl)(9-fluorenyl)(methyl)silane with lithiated polystyrene. The lithiated polystyrene prepared above was reacted with 6.04 g (15.64 mmol) (chloro)(cyclopentadienyl)(9-fluorenyl)(methyl)silane in 50 mL diethyl ether. The reaction mixture was stirred for 48 hours at room temperature. The supernatant was decanted and the thus produced yellow polymer bound ligand (cyclopentadienyl)(9-fluorenyl)(methyl)(polystyryl)silane was washed 5 times with 50 mL diethyl ether.

The polymer bound metallocene (cyclopentadienyl)(9-fluorenyl)(methyl)(polystyryl)silane zirconium dichloride was prepared by reacting lithiated polymer bound ligand with zirconium tetrachloride. The lithiated polymer bound ligand was prepared by reacting (cyclopentadienyl)(9-fluorenyl)(methyl)(polystyryl)silane produced as described above with 20 mL (32.00 mmol) n-butyllithium in 50 mL diethyl ether. The reaction mixture was stirred for 48 hours at room temperature. The supernatant was decanted and the orange polymer was washed 3 times with 50 mL diethyl ether. The thus produced lithiated polymer bound ligand was then reacted with 3.70 g (15.87 mmol zirconium tetrachloride in 50 mL diethyl ether. The reaction mixture was stirred overnight at room temperature. The supernatant was decanted and the thus produced orange polymer bound metallocene (cyclopentadienyl)(9-fluorenyl)(methyl)(polystyryl)silane zirconium dichloride was washed 3 times with 50 mL diethyl ether and dried overnight.

Catalyst systems were prepared by activating the polymer bound metallocenes with excess methylaluminoxane (MAO). Ethylene polymerizations were conducted in the following manner employing the catalyst systems. A one liter autoclave was charged with 500 mL hexane and a mixture of 10 mL MAO and a predetermined amount of polymer bound catalyst. The autoclave temperature was raised to 60° C. and held for one hour at a constant ethylene pressure of 9 bar. The polymer bound catalyst systems did not precipitate polymer on the wall of the reactor during polymerization.

Example 3

Lithiated polystyrene was prepared by reacting 1 g brominated polystyrene, prepared as described above, with 10 mL n-butyllithium (1.6M in hexane) in 30 mL toluene in a flask under argon. The mixture was stirred for 6 hours at 60° C. The reaction mixture was washed 3 times with 50 mL ether.

The polymer bound ligand (diphenyl)(9-fluorenyl)(polystyryl)silane was prepared by reacting the lithiated polystyrene was reacted with 1.53 g (chloro)(diphenyl)(9-fluorenyl)silane (4 mmol), prepared as described in Example 1, in 50 mL ether. The mixture was stirred at room temperature for 14 hours. The reaction mixture became yellow green. The solvent was decanted and washed 2 times with 50 mL ether, 50 mL methanol, and 2 times with 50 mL ether.

Polymer bound metallocene (diphenyl)(9-fluorenyl)(polystyryl)silane cyclopentadienyl zirconium dichloride was prepared by reacting lithiated polymer bound ligand with cyclopentadienylzirconium trichloride. The lithiated polymer bound ligand was prepared by reacting (diphenyl)(9-fluorenyl)(polystyryl)silane, prepared as described above, with 10 mL n-butyllithium (1.6M in hexane) in 50 mL ether. The mixture was stirred for 24 hours at room temperature. The solvent was decanted and the yellow solid remaining was washed 3 times with 50 mL ether. Then 50 mL ether and 0.79 g (3 mmol) cyclopentadienylzirconium trichloride was added to the yellow solid and the mixture was stirred for 48 hours. The solvent was decanted and the thus produced (diphenyl)(9-fluorenyl)(polystyryl)silane cyclopentadienylzirconium dichloride was washed 3 times with 50 mL ether and dried.

The olefin polymerization catalyst system was prepared by reacting 100 mg (diphenyl)(9-fluorenyl)(polystyryl)silane cyclopentadienylzirconium dichloride, prepared as described above, with 5 mL MAO (30 weight % in toluene).

The polymerization reactor was charged with 500 mL hexane, 20 mL MAO, and ethylene. The catalyst system was added to the reactor and the temperature raised to 60° C. The polymerization was conducted for 1 hour. The yield was 27 g polyethylene.

That which is claimed is:

1. A polymer bound metallocene represented by the formula $QM(R)_mZY_n$:

wherein Q is polystyrene;

wherein M is Si, C, Ge, Sn, P, or N;

wherein each R is a hydrocarbyl group independently selected from the group consisting of alkyl and cycloalkyl groups containing 1 to 20 carbon atoms, aryl groups containing 6 to 20 carbon atoms, and cyclopentadienyl-type groups, with the proviso that at least one R group is a cyclopentadienyl-type group and when M is C at least two R groups are cyclopentadienyl-type groups, wherein said cyclopentadienyl-type groups are cyclopentadienyl, substituted cyclopentadienyl, indenyl, substituted indenyl, fluorenyl, or substituted fluorenyl, wherein the substituents include hydrocarbyl groups containing 1 to 12 carbon atoms, alkoxy groups containing 1 to 12 carbon atoms, or halide;

wherein m is 2 or 3;

wherein Z is Zr, Hf, Ti, or V;

wherein each Y is individually selected from the group consisting of halides, methyl, hydrogen, and cyclopentadienyl-type groups containing 5 to 36 carbon atoms; and wherein n is 2 or 3.

2. A polymer bound metallocene according to claim 1 wherein Z is Zr.

3. A polymer bound metallocene according to claim 2 which is (diphenyl)(9-fluorenyl)((polystyryl)cyclopentadienyl)silane zirconium dichloride.

4. A polymer bound metallocene according to claim 2 which is (cyclopentadienyl)(9-fluorenyl)(methyl)(polystyryl)silane zirconium dichloride.

5. A polymer bound metallocene according to claim 2 which is (diphenyl)(9-fluorenyl)(polystyryl)silane cyclopentadienylzirconium dichloride.

6. A polymer bound metallocene according to claim 2 which is (cyclopentadienyl)(9-fluorenyl)(methyl)((polystyryl)methyl)silane zirconium dichloride.

7. A polymer bound metallocene according to claim 2 which is (diphenyl)(9-fluorenyl)((polystyryl)methyl)silane cyclopentadienylzirconium dichloride.

* * * * *